(12) United States Patent
Whyte

(10) Patent No.: US 7,445,224 B2
(45) Date of Patent: Nov. 4, 2008

(54) FOLDING BICYCLE

(75) Inventor: Jon Frank Ross Whyte, Winchcombe (GB)

(73) Assignee: ATB Sales Limited, East Sussex (GB)

( * ) Notice: Subject to any disclaimer, the term of this patent is extended or adjusted under 35 U.S.C. 154(b) by 96 days.

(21) Appl. No.: 10/556,817

(22) PCT Filed: May 13, 2004

(86) PCT No.: PCT/GB2004/002082

§ 371 (c)(1),
(2), (4) Date: Nov. 15, 2005

(87) PCT Pub. No.: WO2004/101350

PCT Pub. Date: Nov. 25, 2004

(65) Prior Publication Data

US 2007/0013162 A1    Jan. 18, 2007

(30) Foreign Application Priority Data

May 16, 2003  (GB) .................................. 0311339.6

(51) Int. Cl.
*B62K 1/00*  (2006.01)
(52) U.S. Cl. ...................... 280/278; 280/287
(58) Field of Classification Search ................. 280/278, 280/287
See application file for complete search history.

(56) References Cited

U.S. PATENT DOCUMENTS

| | | | |
|---|---|---|---|
| 3,374,009 A | | 3/1968 | Jeunet |
| 3,993,322 A | * | 11/1976 | Van Tijen .................... 280/278 |
| 4,111,447 A | * | 9/1978 | Ishida .......................... 280/278 |
| 4,182,522 A | * | 1/1980 | Ritchie ......................... 280/278 |
| 4,582,335 A | * | 4/1986 | Paioli et al. ................... 280/278 |
| 4,842,292 A | * | 6/1989 | Wang ........................... 280/287 |
| 6,279,935 B1 | * | 8/2001 | Wagner ........................ 280/287 |
| 6,364,335 B1 | * | 4/2002 | Mombelli ..................... 280/287 |
| 6,425,598 B2 | * | 7/2002 | Murayama .................... 280/278 |
| 6,585,278 B1 | * | 7/2003 | Cerqua et al. ................ 280/287 |
| 6,702,312 B1 | * | 3/2004 | Miksik ......................... 280/287 |
| 6,979,013 B2 | * | 12/2005 | Chen ............................ 280/287 |
| 2007/0007744 A1 | * | 1/2007 | Colman ........................ 280/278 |

FOREIGN PATENT DOCUMENTS

| | | |
|---|---|---|
| DE | 4313832 A1 | 11/1994 |
| DE | 20115130 U | 11/2001 |
| DE | 20300031 U1 | 3/2003 |
| EP | 0026800 A1 | 4/1981 |
| EP | 1142780 A2 | 10/2001 |
| FR | 2830230 A1 | 4/2003 |
| GB | 1484143 | 8/1977 |
| GB | 1580048 | 11/1980 |
| GB | 2373770 A | 10/2002 |
| JP | 2002-200995 A | 7/2002 |
| WO | WO 97/10141 A1 | 3/1997 |

* cited by examiner

OTHER PUBLICATIONS

Patent Abstracts of Japan, vol. 1998, No. 12, Oct. 31, 1998 & JP 10 194179 A (Yamaha Motor Co Ltd), Jul. 28, 1998.

*Primary Examiner*—Lesley D. Morris
*Assistant Examiner*—Maurice Williams
(74) *Attorney, Agent, or Firm*—Sughrue Mion, PLLC

(57) ABSTRACT

A folding bicycle includes a frame (10) with a main member (11) extending in the fore and aft direction of the bicycle and a rear wheel assembly (19) in the region of a rearward end of the member (11). The assembly (19) is pivotably connected with the frame to be movable between a use position in which a rear wheel (20) of the assembly in side elevation of the bicycle is disposed rearwardly of the frame and a folded position in which the wheel in the side elevation is disposed partly alongside the main member (10). A pivot connection allowing lateral redisposition of the wheel in this manner can have the form of a hinge (31) with a horizontal axis inclined relative to the vertical longitudinal plane of the bicycle.

14 Claims, 1 Drawing Sheet

FOLDING BICYCLE

The present invention relates to a folding bicycle.

Folding bicycles are in widespread use in urban and other environments in circumstances where folding into more compact dimensions is of advantage to assist storage in buildings or for convenience in other forms of transport, such as rail carriages and motor vehicles. To be successful, such a bicycle has to not only be capable of folding into a small size for convenient carrying and storage, but also has to have a stiff and lightweight structure so that it rides in much the same way as a normal bicycle.

The positions of the three points of contact with the rider, i.e. saddle, pedals and handlebars, cannot be significantly altered from a standard bicycle without an adverse effect on ride, efficiency of use and rider comfort. Thus, the number and disposition of fold points is critical to a satisfactory design. For example, the greater the number of fold points the smaller the achievable fold package, but the less the rigidity in the unfolded, use state and the greater the overall weight. In addition, many existing designs require the use of non-standard basic components, such as wheel hubs and gearing systems, which increase production costs and prevent later mixing and matching of parts.

It is therefore the principal object of the present invention to provide a folding bicycle which can be folded at the rearward end in a compact manner, but retains a lightweight and stiff structure at this end in the unfolded or use state.

A subsidiary object of the invention is to provide a folding bicycle with a rear construction which, notwithstanding inclusion of a folding system, permits utilisation of selected standard components, for example rear wheel and hub and a chain drive system.

According to the present invention there is provided a folding bicycle including a frame with a main member extending substantially in the fore and aft direction of the bicycle and a rear wheel assembly disposed in the region of a rearward end of the member, the assembly being pivotably connected with the frame to be movable between a use position in which a rear wheel of the assembly in side elevation of the bicycle is disposed rearwardly of the frame and a folded position in which the wheel in the side elevation is disposed partly alongside the main member.

In the case of such a bicycle rearward end arrangement, folding of the rear wheel is achieved without the need for a fold location within the assembly as such or within the frame, the fold point being located at a junction of the assembly and the frame so that the structural integrity of each of the two principal components of assembly and frame need not be diminished. Due to the provided overlap of the rear wheel and the main fore and aft member of the frame, the rear part of the bicycle has comparatively small dimensions in the folded state of the rear assembly so that a compact package for transport, including carrying by the user, and storage can be achieved.

Preferably, the assembly is pivotably connected with the frame to be pivotable about an axis disposed at such an inclination relative to a vertical longitudinal plane of the bicycle that in the use position the rear wheel is disposed substantially in the longitudinal plane and in the folded position in a plane inclined relative to the longitudinal plane. By provision of, in effect, an angled pivot joint at the point of pivotal interconnection of the frame and assembly the assembly during movement into its folded position can swing progressively out of the bicycle vertical longitudinal plane, in relation to which in the use position it will normally be symmetrically disposed, so that the rear wheel is able to move alongside the main frame member rather than merely below that member as in most conventional folding systems. In the folded position the rear wheel will thus lie generally in a plane at a small angle relative to the bicycle vertical longitudinal plane.

The inclination of the axis of pivotation of the rear wheel assembly relative to the bicycle vertical longitudinal plane is preferably substantially 5°, which should be sufficient for the rear wheel to be able to lie alongside the frame by the time the wheel has travelled from the use position of the assembly to a point at which the frame is encountered. A greater or lesser angle of inclination may be appropriate depending on, in particular, the width dimensions of the various components of the assembly. The angular range of travel of the assembly between the use position and the folded position may also depend on specific constructional aspects, but is typically in the vicinity of 180°.

The assembly is preferably pivotably connected with the frame in a rearward base region thereof, for example at a seat tube of the frame. Such a location of the point of pivotal interconnection of the frame and assembly creates a precondition for swinging the assembly downwardly and then upwardly alongside the frame. In addition, the assembly is preferably detachably connected with the frame at a spacing from the pivotable connection, so that the assembly, in the use position, has two spaced-apart points of attachment to the frame. The provision of two such points at a spacing from one another makes a significant contribution to the structural rigidity of the unit of frame and rear wheel assembly in the use position of the latter, thus the state in which the bicycle is ridden. The detachable connection can be by way of quick-action fastening and unfastening means, so that the assembly can be quickly released for pivoting and equally quickly secured in place for use of the bicycle.

As a further particularly advantageous feature the bicycle can include chain drive means for driving the rear wheel and a chain collecting device to collect a chain of the chain drive so as to take up slack in the chain on movement of the assembly from the use position to the folded position. Pivotation of the rear wheel assembly into the folded position produces slack in the chain which could cause the chain to detach from, for example, sprockets of the drive means. For this reason, provision of a chain collecting device of the kind mentioned ensures that the chain remains in place throughout the folding and unfolding processes.

For preference, the chain collecting device comprises deflecting means to engage an upper and a lower run of the chain during movement of the assembly from the use position to the folded position and to progressively deflect the runs by formation in the upper run of a bend directed away from the lower run and by formation in the lower run of a bend directed towards the upper run. Such deflecting means is preferably engageable with the underside of each run and can be arranged to cause the deflected runs to cross over one another during movement of the assembly from the use position to the folded position. Collection of the chain by formation of bends in the runs and causing the runs to cross over one another maintains tension in the chain in a simple manner so that the chain does not depart from its associated sprockets or other driving and driven elements. The deflecting means preferably comprises curved guide surfaces, for example circumferential surfaces of cylindrical elements, for deflection of the runs therearound. These cylindrical elements can be mounted on a bracket attached to the frame at the base thereof, the bracket and elements in that position being able to be located partly within the perimeter of a drive sprocket of the drive means so that there is minimal increase in the size of the bicycle in its folded state.

The bicycle may further comprise a steering assembly disposed in the region of a forward end of the frame and carrying a front wheel movable between a use position in which the wheel in side elevation is disposed forwardly of the frame and a folded position in which the wheel in the side elevation is disposed partly alongside the main member at the other side of the frame from the rear wheel in the folded position of the rear wheel assembly. The bicycle in folded state then represents a particularly compact package, especially if the two wheels are disposed in substantially parallel planes in the folded positions of the assemblies.

Compactness of the bicycle in its folded state is further enhanced if the frame comprises a seat tube receiving a seat post which protrudes from an upper end thereof and carries a seat, the seat post being retractible and extensible relative to the seat tube. The seat post, which will carry the riders seat, can thus be retracted into the seat tube so that the seat may be located in the vicinity of the frame. Moreover, the seat tube can be open at a lower end thereof to permit the seat post to extend out of the tube at its lower end when retracted, whereby the lower part of the retracted seat post can jut out of the seat tube in an area which is, in any case, partly occupied by other components, such as the rear wheel drive systems. The seat post is preferably securable in a fixed relationship to the tube by quick-action securing means, so that release of the post and subsequent fixing in a use position can be carried out easily and quickly.

An embodiment of the present invention will now be more particularly described by way of example with reference to the accompanying drawings, in which.

Figure 1:
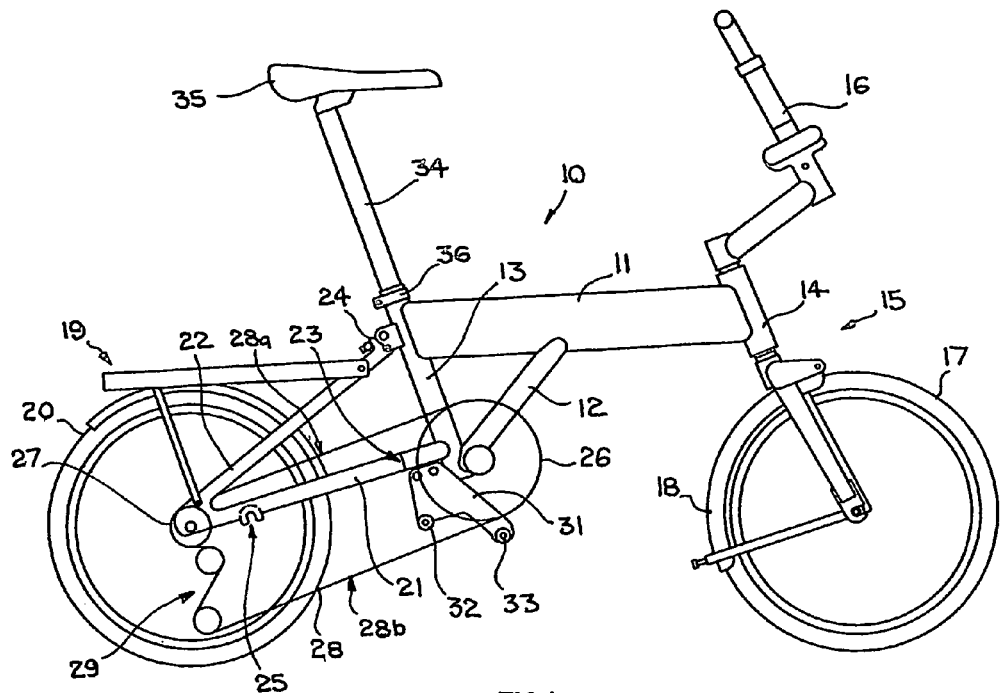
FIG. 1 is schematic side elevation of a bicycle embodying the invention, showing a rear wheel assembly of the bicycle in use position.

Referring now to the drawings there is shown a folding bicycle comprising a frame 10 having as basic elements a relatively deep main frame member 11 extending in the fore-and-aft direction of the bicycle, a down tube 12 extending downwardly from the main member at a location slightly behind the midpoint of its length and a seat tube 13 secured to and extending downwardly between the rearward end of the main member and the lowermost end of the down tube. The main member 11, which can be a fabricated hollow aluminium body, carries at its forward end a head tube 14 in which a steering assembly 15, inclusive of handlebars 16 and a front wheel 17, is rotatably mounted. The front wheel 17 is carried by wheel carrier 18 which is foldable so that the unit of carrier and wheel can lie against the frame 10 to reduce the size of the bicycle in the front region. Folding is achieved by way of a hinge connection of the carrier 18 to front forks of the steering assembly in the region of the perimeter of the front wheel 17 and a detachable connection of the carrier to the forks in the region of the wheel axis by way of a quick-release clamping mechanism. Specific details of the construction and folding capability of the front wheel carrier are not relevant to the present invention and accordingly are not discussed.

At the rearward end of the bicycle a foldable rear wheel assembly 19 is pivotably connected with the frame 10 to be movable between a use position in which the bicycle can be ridden and a folded position in which the rear part of the bicycle is reduced to compact dimensions to facilitate transport and storage. The assembly 19 comprises a rear wheel 20 and a rear wheel carrier composed of a lower—or chain—stay 21 and an upper stay 22 rigidly connected with the lower stay, the stays extending divergently from a meeting point at a hub of the wheel 20 and supporting the wheel by way of an axle associated with the hub. Each stay is, in fact, formed by a respective arm on each side or the wheel; the arms of each stay can remain separate over their length or unite outwardly of the circumference of the rear wheel.

The rear wheel carrier is pivotably connected to the frame 10 by way of a hinge 23 coupling the lower stay 21 to the seat tube 13 at its lower end and detachably connected to the frame by way of a quick-action fastening and unfastening device 24 coupling the upper stay 22 to the seat tube 13 at its upper end, thus at a spacing from the hinge 23. The axis of the hinge 23 is disposed to be substantially horizontal and at an inclination of approximately 5° to the vertical longitudinal plane of the bicycle, the rear wheel assembly 10 being generally disposed in this plane in its use position. After operation of the device 24 to uncouple the upper stay 22 from the seat tube 13, the rear wheel assembly 19 can be pivoted about the axis of the hinge 23 through approximately 180° to its folded position by movement downwardly and then upwardly and forwardly. During this movement of the assembly the inclined axis of the hinge 23 has the effect that the assembly also progressively moves to one side of the vertical longitudinal plane of the bicycle so that by the time it has reached its folded position, i.e. travelled through approximately 180°, it lies generally in a plane inclined relative to the vertical longitudinal plane. The relative inclination of the two planes is sufficient for the rear wheel 20 to move far enough to the side of the frame 10 to be able to overlap the main member 11 thereof in side elevation of the bicycle. By contrast to prior art arrangements, in which the rear wheel in the folded state lies below the frame, the ability of the wheel 20 to overlie a significant part of the frame, thus the main member 11 and also part of the down tube 12, results in a particularly close relationship of the frame and folded assembly.

Figure 2:
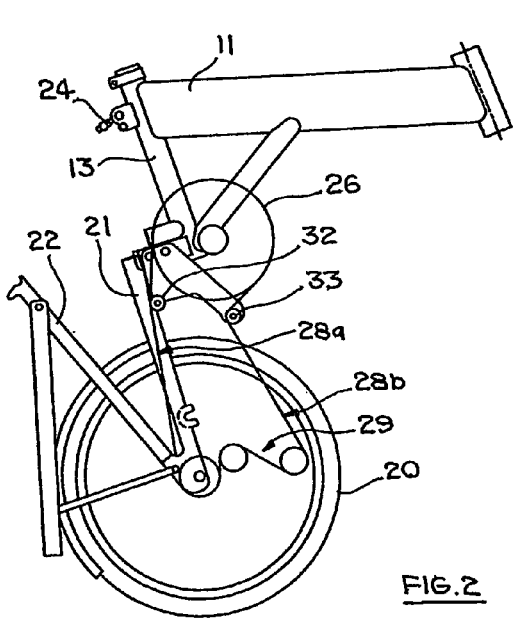
FIG. 2 is a view similar to FIG. 1, but depicting only the rear part of the bicycle and showing the rear wheel assembly part way between the use position and a folded position.
Figure 3:
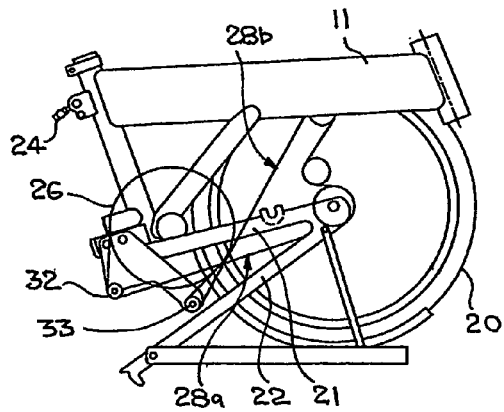
FIG. 3 is a view similar to FIG. 2, but showing the rear wheel assembly in the folded position.

FIG. 1 shows the rear wheel assembly 19 in its use position, FIG. 2 the assembly in a position halfway between the use position and the folded position and FIG. 3 the assembly in its folded position. The last figure clearly demonstrates the compact format achievable through overlap of the main member 11 by the rear wheel 20.

Return of the rear wheel assembly 19 to the use position is achieved by movement of the assembly in the reverse direction and recoupling of the upper stay 22 to the seat tube 13 by way of the quick-action fastening and unfastening device 24. Both folding and unfolding of the rear part of the bicycle are thus accomplished quickly and easily.

When the front wheel carrier 18 is correspondingly folded to reduce the size of the front part of the bicycle, the hinge connection of the carrier to the steering assembly 18 allows the front wheel 17 to be similarly brought into a position in which it overlaps the main member 11 of the frame 10, but disposed on the other side of the frame from the wheel 20 of the folded rear wheel assembly 19. In this state, the two wheels can lie in substantially parallel planes, both at an angle to the vertical longitudinal plane of the bicycle. In order to maintain this state, the lower stay 21 of the rear wheel assembly 19 includes a semi-cylindrical coupling socket 25 co-operable with the afore-mentioned quick-release clamping mechanism of the front wheel to lock that wheel in position. The two assemblies are thereby locked together and the bicycle can be lifted and transported in folded state without risk of unfolding. The coupling socket 25, for example, receives a spindle of the mechanism, and associated clamping components of the mechanism bear against end faces of the socket to keep the spindle in place.

The rear wheel 20 of the bicycle is driven by a conventional sprocket-and-chain drive system comprising a drive sprocket 26 rotated by pedals (not shown) rotatably mounted in the region of the junction of the down tube 12 and seat tube 13, a driven sprocket 27 coupled to and rotatable with the hub of the rear wheel 20 and a chain 28 interconnecting the sprockets. In practice, either or each of the sprockets will have the form of a plurality of sprocket wheels of different diameter selectably engagable by the chain to vary the drive transmission ratio of the system, transfer of the chain from sprocket wheel to sprocket wheel being effected by a conventional derailleur mechanism 29. Movement of the rear wheel assembly 19 from the use position (FIG. 1) to the folded position (FIG. 3) produces slack in the chain 28 liable to cause it to disengage from one or other of the sprockets 26 and 27. To counteract this, the bicycle includes a chain collecting device specifically to take up chain slack. The device comprises a bracket 31 provided with an upper cylindrical deflecting bobbin 32 and a lower cylindrical deflecting bobbin 33 disposed in front of and slightly below the upper bobbin. The disposition of the bobbins is such that on movement of the rear wheel assembly downwardly towards its folded position the circumferential surface of the upper bobbin 32 engages the underside of the top run 28a of the chain 28 and the circumferential surface of the lower bobbin 33 engages the underside of the lower run 28b of the chain. With continuing movement of the assembly to the folded position the upper bobbin 32 produces a progressively increasing bend in the upper run 28a in direction away from the lower run 28b and the lower bobbin 33 correspondingly produces a progressively increasing bend in the lower run 28b in direction towards the upper run 28a, the two bends taking up slack in the chain as it occurs. An early stage of formation of the bends in the two runs is apparent in FIG. 2. As the rear wheel assembly 19 approaches the folded position the chain runs 28a and 28b cross over one another, as shown in FIG. 3. The two runs are also constrained to extend obliquely through the vertical longitudinal plane of the bicycle as a consequence of location of the drive sprocket 26 and bobbins 32 and 33 on one side of the plane and the rear wheel 20—in the folded state of the rear wheel assembly—on the other side of that plane. The two bobbins have flanges at their free ends remote from the bracket 31 to prevent the chain runs from slipping off the bobbins.

Deflection of the chain runs 28a and 28b by the bobbins 32 and 33 to remove slack from the chain is assisted by the derailleur mechanism 29, which is spring-loaded to constantly induce tension in the chain.

A final feature to reduce the area of the rear part of the bicycle consists of provision of a seat post 34 which is slidably engaged in the seat tube 13 and, in the use state of the bicycle, protrudes from the upper end of the tube. The post 34 carries a seat 35 and is retained in the use setting, illustrated in FIG. 1, by a quick-release clamp 36. The post 34 is retractible into the tube 13 and, in particular, to such an extent that a lower end portion of the post emerges from the tube 13 via an open lower end thereof. The seat 35 can thus be brought into a position close to the main member 11 of the frame 10. Return of the seat to the use position is by simple extension of the post 34 from the tube 13 and reapplication of the clamp 36.

The area of the front part of the bicycle can be similarly reduced by folding the handlebars 16 to partly overlie the frame 10.

A bicycle embodying the invention thus allows attainment of particularly favourable minimum dimensions of the rear part of the bicycle when in the folded state of the rear wheel assembly, but without compromising the rigidity of the assembly in the use position.

The invention claimed is:

1. A folding bicycle including a frame with a main member extending in the fore and aft direction of the bicycle and having a forward end and a rearward end with respect to said direction, a rear wheel assembly comprising a rear wheel, the assembly being disposed in the region of said rearward end of the main member of the frame and being pivotably connected with the frame to be movable between a use position in which the rear wheel of the assembly in side elevation of the bicycle is disposed rearwardly of the frame and a folded position in which the rear wheel in the side elevation is in part disposed alongside the main member, chain drive means including a chain for driving the rear wheel, and drive and driven sprockets both engaged by the chain and a chain collecting device disposed to be clear of the chain during driving of the rear wheel and engageable with the chain so as to take up slack therein on movement of the rear wheel assembly from said use position to said folded position while keeping the chain in engagement with both the sprockets.

2. A bicycle according to claim 1, wherein the collecting device comprises deflecting means to engage an upper and a lower run of the chain during movement of the assembly from the use position to the folded position and to progressively deflect the runs by formation in the upper run of a bend directed away from the lower run and by formation in the lower run of a bend directed towards the upper run.

3. A bicycle according to claim 2, wherein the deflecting means is engageable with an underside of each chain run.

4. A bicycle according to claim 2, wherein the deflecting means is arranged to cause the deflected chain runs to cross over one another during movement of the assembly from the use position to the folded position.

5. A bicycle according to claim 2, wherein the deflecting means comprises curved guide surfaces for deflection of the chain runs therearound.

6. A bicycle according to claim 5, wherein the curved guide surfaces comprise parts of circumferential surfaces of cylindrical elements.

7. A bicycle according to claim 6, wherein the elements are mounted on a bracket attached to the base of the frame.

8. A bicycle according to claim 1, wherein the assembly is pivotably connected with the frame to be pivotable about an axis disposed at such an inclination relative to the centre vertical longitudinal plane of the bicycle when the bicycle is upright that in said use position the rear wheel lies in or substantially in the longitudinal plane and in said folded position in a plane inclined relative to the longitudinal plane.

9. A bicycle according to claim 8, wherein the inclination is approximately 5°.

10. A bicycle according to claim 1, wherein the assembly is pivotable through approximately 180° between said use position and said folded position.

11. A bicycle according to claim 1, wherein the assembly is pivotably connected with the frame in a rearward base region thereof.

12. A bicycle according to claim 1, wherein the assembly is additionally detachably connected with the frame at a spacing from the pivotable connection of the assembly with the frame.

13. A bicycle according to claim 1, wherein the rear wheel assembly comprises coupling means able to be coupled with a front wheel to lock it in the folded position.

14. A bicycle according to claim 1, wherein the frame comprises a seat tube receiving a seat post which protrudes from an upper end thereof and carries a seat, the seat post being retractable and extensible relative to the seat tube and the seat tube being open at a lower end thereof to permit the seat post to extend out of the tube at the lower end when retracted.

* * * * *